(12) United States Patent
Nagasawa

(10) Patent No.: US 11,440,497 B2
(45) Date of Patent: Sep. 13, 2022

(54) OCCUPANT PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 58 days.

(21) Appl. No.: 16/774,094

(22) Filed: Jan. 28, 2020

(65) Prior Publication Data
US 2020/0307490 A1 Oct. 1, 2020

(30) Foreign Application Priority Data
Mar. 29, 2019 (JP) ............................. JP2019-069386

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 21/23184* (2013.01); *B60R 2021/23146* (2013.01)

(58) Field of Classification Search
CPC ............ B60R 21/207; B60R 21/23138; B60R 2021/23146; B60R 2021/23161
See application file for complete search history.

(56) References Cited

U.S. PATENT DOCUMENTS

| | | | |
|---|---|---|---|
| 4,592,523 A | 6/1986 | Herndon | |
| 6,029,993 A * | 2/2000 | Mueller | B60R 21/2338 280/730.2 |
| 7,665,761 B1 | 2/2010 | Green et al. | |
| 9,758,127 B1 | 9/2017 | Farooq et al. | |
| 10,632,958 B2 | 4/2020 | Dry et al. | |
| 10,710,539 B2 | 7/2020 | Cho et al. | |
| 10,926,733 B2 | 2/2021 | Dry et al. | |
| 10,967,826 B2 | 4/2021 | Henriksson et al. | |
| 11,066,036 B2 | 7/2021 | Gwon et al. | |

(Continued)

FOREIGN PATENT DOCUMENTS

| | | | | |
|---|---|---|---|---|
| DE | 102017218338 A1 * | 4/2019 | ........... | B60R 21/207 |
| DE | 102019106035 A1 * | 9/2019 | ........... | B60R 21/231 |

(Continued)

OTHER PUBLICATIONS

Saito et al. JP WO 2019/107398 Machine English Translation, ip.com (Year: 2018).*

(Continued)

*Primary Examiner* — Karen Beck
(74) *Attorney, Agent, or Firm* — Smith, Gambrell & Russell, LLP

(57) ABSTRACT

An occupant protection apparatus includes an airbag, an upper holder, and a tension member. The airbag is disposed along side surfaces of a seat from an upper part of the seat into space under a seat surface. The upper holder is configured to hold an upper part of the airbag and disposed between and above shoulders of an occupant to sit on the seat in a right-to-left direction. The tension member is configured to, upon deployment of the airbag, apply a tensional force to a lower part of the deploying airbag to pull the lower part in a direction opposite to a side surface on which the airbag is deployed.

17 Claims, 5 Drawing Sheets

(56) References Cited

U.S. PATENT DOCUMENTS

| | | |
|---|---|---|
| 2013/0093224 A1 | 4/2013 | Dainese et al. |
| 2014/0042733 A1* | 2/2014 | Fukawatase ........ B60R 21/0136 |
| | | 280/730.2 |
| 2016/0082915 A1 | 3/2016 | Madaras |
| 2016/0347272 A1 | 12/2016 | Kato et al. |
| 2017/0144622 A1 | 5/2017 | Perlo et al. |
| 2017/0259704 A1 | 9/2017 | Madaras |
| 2017/0259774 A1 | 9/2017 | Matsushita et al. |
| 2018/0222432 A1 | 8/2018 | Schneider |
| 2019/0016293 A1 | 1/2019 | Saso |
| 2019/0023214 A1 | 1/2019 | Kitagawa |
| 2019/0054890 A1 | 2/2019 | Kwon |
| 2019/0248323 A1* | 8/2019 | Saito ................. B60R 21/23138 |
| 2019/0291678 A1 | 9/2019 | Cho et al. |
| 2020/0307491 A1* | 10/2020 | Nagasawa ............ B60R 21/207 |
| 2020/0406855 A1* | 12/2020 | Saito ................... B60R 21/2338 |
| 2021/0170983 A1* | 6/2021 | Shin ................. B60R 21/23138 |

FOREIGN PATENT DOCUMENTS

| | | | | |
|---|---|---|---|---|
| JP | 3950356 B2 * | 8/2007 | ....... B60R 21/23138 | |
| JP | 2009029182 A * | 2/2009 | | |
| JP | 2009137441 A * | 6/2009 | | |
| JP | 2013-124063 A | 6/2013 | | |
| JP | 2013123989 A * | 6/2013 | | |
| JP | 2013147040 A * | 8/2013 | | |
| JP | 2013-220714 A | 10/2013 | | |
| JP | 2014-012495 | 1/2014 | | |
| JP | 2014043127 A * | 3/2014 | | |
| JP | 5952680 B2 * | 7/2016 | | |
| JP | 2019-147426 A | 9/2019 | | |
| KR | 102167448 B1 * | 10/2020 | | |
| KR | 102225420 B1 * | 1/2021 | | |
| KR | 102209220 B1 * | 3/2021 | | |
| WO | WO-2013099888 A1 * | 7/2013 | ............. B60R 21/18 | |
| WO | WO-2016039160 A1 * | 3/2016 | ............. B60R 22/00 | |
| WO | 2017/179839 A1 | 10/2017 | | |
| WO | WO-2019107053 A1 * | 6/2019 | ........... B60R 21/207 | |
| WO | WO-2019107398 A1 * | 6/2019 | ......... B60R 21/2338 | |
| WO | 2020/080747 A1 | 4/2020 | | |
| WO | WO-2021033433 A1 * | 6/2020 | | |
| WO | WO-2021059766 A1 * | 8/2020 | | |
| WO | WO-2021065304 A1 * | 9/2020 | | |
| WO | WO-2021059766 A1 * | 4/2021 | ........... B60R 21/233 | |

OTHER PUBLICATIONS

Fukawatase et al. JP 2013-123989A, English Machine Translation, ip.com (Year: 2013).*

T. Ujiie, JP 2012-04845A English Machine Translation, ip.com (Year: 2012).*

Office Action dated May 13, 2021 in U.S. Appl. No. 16/774,112 (9 pages).

* cited by examiner

OCCUPANT PROTECTION APPARATUS

CROSS-REFERENCE TO RELATED APPLICATIONS

The present application claims priority from Japanese Patent Application No. 2019-069386 filed on Mar. 29, 2019, and the entire contents of which are hereby incorporated by reference.

BACKGROUND

The disclosure relates to an occupant protection apparatus.

A known seat belt apparatus and an airbag apparatus have been used as an occupant protection apparatus to protect an occupant of a vehicle such as an automobile from a collision and so forth. This sort of airbag apparatus includes a front airbag configured to deploy backward from in front of the occupant. This front airbag is configured to protect the occupant at, for example, a front collision of the vehicle by deploying to receive and support the occupant moving forward due to the impact of the front collision.

The airbag apparatus also includes a curtain airbag for a lateral collision of the vehicle. This curtain airbag is configured to deploy along the side surfaces of the vehicle interior in the front-to-back direction of the vehicle. The curtain airbag is configured to protect the occupant in, for example, a lateral collision of the vehicle by deploying to receive and support the occupant moving outward in the vehicle width direction due to the impact of the lateral collision. Meanwhile, in case of the lateral collision, the occupant sitting on the side (referred to as "far side") far from the side (referred to as "near side") hit by an object is forcibly moved to the near side, and therefore a far side airbag configured to deploy between the driver's seat and the seat next to the driver has been proposed.

However, differently from an airbag configured to deploy in the near side, a common far side airbag is not adjacent to a supportive object such as a side door. Therefore, the far side airbag expanding and deploying may fall down due to the impact to receive the occupant, and consequently may not reliably hold the occupant. To address this, there has been provided a side airbag apparatus including a small airbag configured to deploy on the far side and a belt set outside the airbag to support the airbag, which is disclosed, for example, in Japanese Unexamined Patent Application Publication No. 2014-012495.

SUMMARY

An aspect of the disclosure provides an occupant protection apparatus including an airbag, an upper holder, and a tension member. The airbag is disposed along side surfaces of a seat from an upper part of the seat into space under a seat surface. The upper holder is configured to hold an upper part of the airbag and disposed between and above shoulders of an occupant to sit on the seat in a right-to-left direction. The tension member is configured to, upon deployment of the airbag, apply a tensional force to a lower part of the airbag to pull the lower part in a direction opposite to a side surface on which the airbag is deployed.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Various types of vehicle collisions in all directions are possible, and some types of collisions exhibit complex movements, such as rolling and yawing, and therefore, to address the various types of collisions, the costs become much expensive. In addition, as a conventional airbag apparatus, a plurality of airbags are used to hold body parts of the occupant, a large force may be focused on a specific part of the occupant.

It is desirable to provide an occupant protection apparatus capable of preventing a large force from being locally applied to the occupant and reducing the impact on the occupant to improve a function to protect the occupant.

Figure 1:
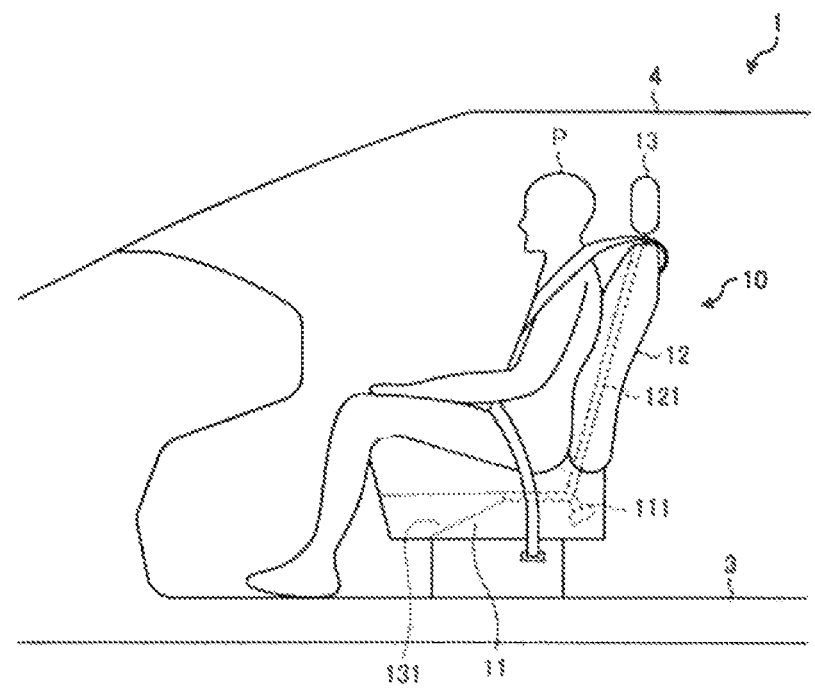
FIG. 1 is a cross-sectional view illustrating an exemplary vehicle equipped with an occupant protection apparatus according to an embodiment of the disclosure.
Figure 2:
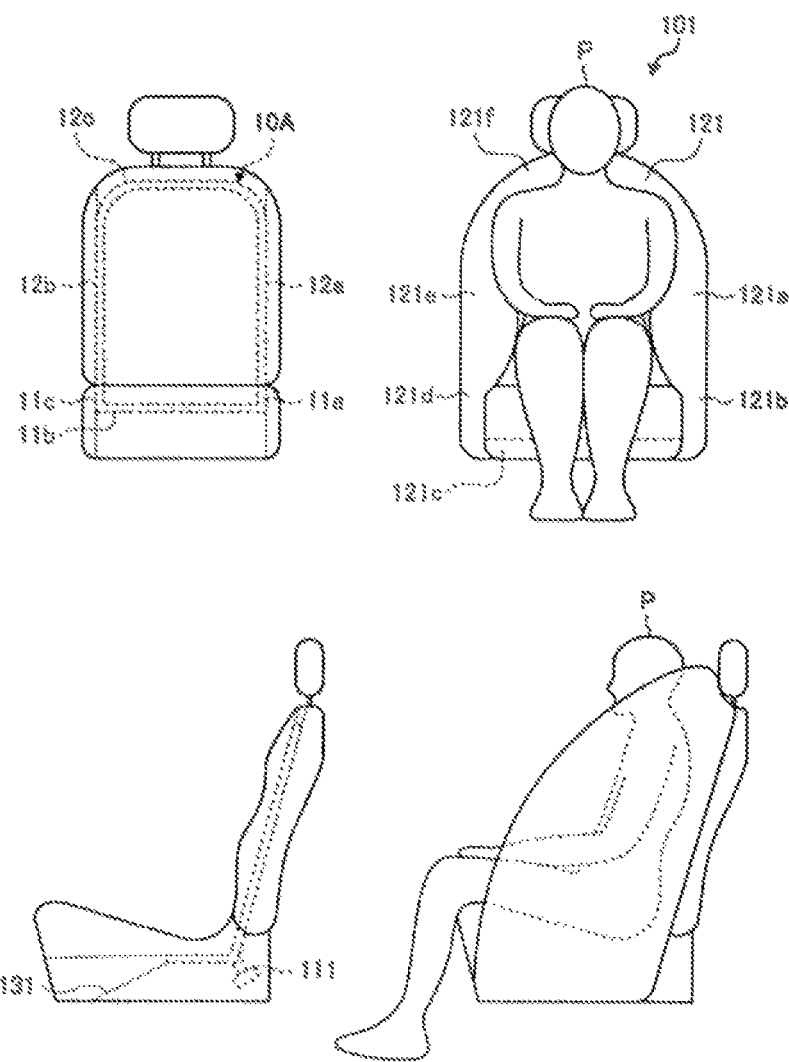
FIG. 2 illustrates a state when an airbag is stored and a state when the airbag is deployed according to the embodiment of the disclosure.

First, the configuration of a vehicle equipped with an occupant protection apparatus according to an embodiment of the disclosure will be described. FIG. 1 is a cross-sectional view illustrating the vehicle equipped with the occupant protection apparatus according to the embodiment of the disclosure. FIG. 2 illustrates a state when an airbag is stored and a state when the airbag is deployed according to the embodiment of the disclosure. FIGS. 3A-3D illustrate a process of deployment of the airbag according to the embodiment of the disclosure.

<Configuration of Vehicle 1>

As illustrated in FIG. 1, an occupant compartment of a vehicle 1 includes an under floor 3 provided in its lower part and a roof 4 provided in its upper part. A seat 10 is provided on the under floor 3.

An occupant P of the vehicle 1 sits on the seat 10. The seat 10 includes a seat cushion (seat bottom) 11 on which the hip and thighs of an occupant P rest, a seat back (backrest) 12 configured to recline, and a head rest (head portion) 13 configured to support the head of the occupant P.

The seat 10 includes a storage member 10A configured to store an airbag 121 described later. The storage member 10A includes storage portions 12a, 12b and 12c of the seat back 12, and storage portions 11a, 11b and 11c of the seat cushion 11. The storage portion 12a of the seat back 12 is provided along the left side of the seat back 12 from the upper end to the lower end of the seat back 12. In addition, the storage portion 12b of the seat back 12 is provided along the right side of the seat back 12 from the upper end to the lower end of the seat back 12. Moreover, the storage portion 12c of the seat back 12 is provided along the upper part of the seat back 12. The storage portion 12b and the storage portion 12c connect with one another, and the storage portion 12c and the storage portion 12a connect with one another.

Meanwhile, the storage portions 11a, 11b and 11c are provided under the seat surface of the seat cushion 11. The storage portion 11a of the seat cushion 11 is provided along the left side of the seat cushion 11 from the back to the front of the seat cushion 11. The back part of the storage portion 11a extends to the upper end of the seat cushion 11. In addition, the storage portion 11b of the seat cushion 11 is provided to extend from side to side in the seat cushion 11.

Moreover, the storage portion 11c of the seat cushion 11 is provided along the right side of the seat cushion 11 from the back to the front of the seat cushion 11. The back part of the storage portion 11c extends to the upper end of the seat cushion 11. The storage portion 11a and the storage portion 11b connect with one another, and the storage portion 11b and the storage portion 11c connect with one another.

Moreover, the storage portion 12a of the seat back 12 and the storage portion 11a of the seat cushion 11 connect with one another, and the storage portion 11c of the seat cushion 11 and the storage portion 12b of the seat back 12 connect with one another. Therefore, the storage portions of the storage member 10A of the seat 10 connect in the order of the storage portion 12a of the seat back 12, the storage portions 11a, 11b, and 11c of the seat cushion 11, the storage portions 12b, 12c and 12a of the seat back 12.

The seat cushion 11 of the seat 10 includes a guide path 131 configured to guide the airbag 121 stored in the storage portion 11b of the seat cushion 11 to deploy in the deployment direction. The guide path 131 is configured to extend forward and obliquely downward from the storage portion 11b of the seat cushion 11. The width of the guide path 131 increases toward the front end of the guide path 131. The front end of the guide path 131 is located near the bottom of the seat cushion 11. The lower part of the seat cushion 11 near the front end of the guide path 131 can be torn, so that the deploying airbag 121 can protrude from the seat cushion 11.

<Configuration of Occupant Protection Apparatus 101>

Next, the configuration of the occupant protection apparatus according to the embodiment of the disclosure will be described. The occupant protection apparatus according to the embodiment is controlled by an airbag deployment control unit (ACU) and an electronic control unit (ECU). The occupant protection apparatus 101 includes an inflator 111 and the airbag 121.

<Inflator>

Upon receiving a signal from an abnormal detector or the ECU having detected a collision of the vehicle 1 or collision prediction, the inflator 111 ignites explosives to generate gas by the chemical reaction due to combustion, and injects the gas into the airbag 121. That is, the inflator 111 is configured to supply gas to the airbag 121. Here, the inflator 111 is provided in the back part of the seat cushion 11 of the seat 10. That is, the inflator 111 is provided below the seat back 12.

For embodiment, when the seat 10 is located in the left side, the inflator 111 is provided near the storage portion 11a of the seat cushion 11 facing the outside of the vehicle 1 (that is, the storage portion 11c faces the center of the vehicle 1), and injects the gas into the airbag 121 stored in the storage portion 11a. By this means, it is possible to quickly deploy part of the airbag 121 in the side facing the outside of the vehicle 1. Alternatively, the inflator 111 may be provided in the lower part of the seat back 12. <Airbag 121>

The airbag 121 has a pouch shape into which the gas is injected by the inflator 111. When the airbag 121 is not actuated, it is compactly folded. The airbag 121 is stored in the seat 10. To be more specific, the airbag 121 is stored in the storage member 10A of the seat 10. That is, the airbag 121 is stored in the storage portions 12a, 12b and 12c of the seat back 12 and the storage portions 11a, 11b and 11c of the seat cushion 11. Therefore, the airbag 121 is provided in the right and left parts and the upper and lower parts of the seat 10 as follows.

Starting from the upper part of the seat back 12, the airbag 121 extends to the lower part of the seat back 12 along one side wall of the seat back 12, gets into the back part of the seat cushion 11 from the lower part of the seat back 12, and goes forward along one side of the seat cushion 11. Then, the airbag 121 crosses to the other side in the seat cushion 11 to extend in the back part of the seat cushion 11, and goes into the lower part of the seat back 12 on the other side. Then, the airbag 121 extends upward along the other side of the seat back 12, extends along the upper part of the seat back 12, and returns to the stating position, so that the airbag 121 is provided in a circular ring shape.

Therefore, the airbag 121 is provided to extend along the sides of the seat back 12 from the upper part of the seat back 12 into the seat cushion 11 under the seat surface. In addition, the part of the airbag 121 provided in the right side and the part of the airbag 121 provided in the left side connect with one another in the upper part and the lower part of the airbag 121. With the embodiment, the airbag 121 is provided from the upper part of the seat back 12, but this is by no means limiting. The airbag 121 may be provided from the head rest.

When the airbag 121 is actuated and deployed to surround the occupant P, the shape of the deployed airbag 121 conforms to the curve of the body of the occupant P. That is, the inner periphery of the airbag 121 includes concave portions for the convex portions of the body of the occupant p and convex portions for the concave portions of the body of the occupant P. For embodiment, the part of the inner periphery of the airbag 121 which contacts the waist of the occupant P is more widely deployed inward than the part of the inner periphery contacting the shoulders of the occupant P.

Hereinafter, for the purpose of illustration, parts of the airbag 121 stored in the storage portion 12a of the seat back 12, the storage portions 11a, 11b, 11c of the seat cushion 11, and the storage portions 12b and 12c of the seat back 12 are referred to as airbags 121a, 121b, 121c, 121d, 121e, and 121f, respectively. Here, note that the airbag 121 is shaped into a seamless circular ring and actually is not separated into the above-described portions, and the positions of the portions are not exact but indicate an approximate range of each of the portions of the airbag 121 stored in the storage portion.

As described above, when the gas is injected into the airbag 121 to expand the airbag 121, mainly the airbag 121c stored in the storage portion 11b of the seat cushion 11 is guided downward and forward along the guide path 131. That is, the guide path 131 functions as an airbag guide. However, this is by no means limiting, and the airbag 121c may be guided downward and forward by using an inflator for guiding, guided by pulling the airbag 121c by using a winder mechanism, or guided by using a hydraulic mechanism.

When the airbag 121 is expanded and deployed, the airbags 121a and 121e protrude outward from the sides of the seat back 12, and the airbag 121f protrudes upward from the upper part of the seat back 12. Meanwhile, the airbags 121b and 121d protrude outward from the sides of the seat cushion 11. In the embodiment, the airbag 121 protrudes outward, but the disclosure is not limited to this. For example, the airbags 121a, 121e, and 121f may protrude forward from the seat back 12, or the airbags 121b and 121d may protrude upward from the seat cushion 11.

<Operation of Occupant Protection Apparatus 101>

Next, the operation of the occupant protection apparatus 101 when the vehicle 1 collides with an object will be described.

When the occupant protection apparatus 101 detects a collision of the vehicle 1 or collision prediction, the inflator 111 is actuated to inject gas into the airbag 121. The gas is injected from the inflator 111 into the airbag 121 such that, first the gas is injected into the airbag 121b stored in the storage portion 11a of the seat cushion 11, and then is injected into the airbag 121c stored in the storage portion 11b extending from side to side in the seat cushion 11. Then, the expanded airbag 121c can no longer be stored in the storage portion 11b of the seat cushion 11, and is guided downward and forward along the guide path 131. In addition, the airbags 121b and 121d stored in the storage portions 11a and 11c of the seat cushion 11 are expanded and protruded from the seat cushion 11 to deploy on the right and left sides of the seat cushion 11.

Then, the gas is injected from the airbags 121b and 121d into the airbags 121a and 121e stored in the storage portions 12a and 12b of the seat back 12. By this means, the airbags 121a and 121b are expanded and protruded from the seat back 12, and deployed on the right and left sides of the seat back 12. Here, as described above, the airbag 121a near the inflator 111 is deployed earlier than the airbag 121e far from the inflator 111.

Moreover, the gas is injected from the airbags 121a and 121e into the airbag 121f stored in the storage portion 12c provided in the upper part of the seat back 12. By this means, the airbag 121f is expanded and protruded from the seat back 12, and deployed above the seat back 12. Alternatively, an upper holder configured to hold the airbag 121f may be provided between and above the shoulders of the occupant P in the right-to-left direction, that is, above near the center of the seat back 12. By this means, it is possible to fix the airbag 121 to the upper part of the seat back 12.

Figure 3A:
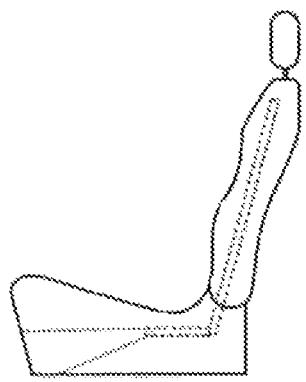
FIGS. 3A-3D illustrate a process of deployment of the airbag according to the embodiment of the disclosure.
Figure 3B:
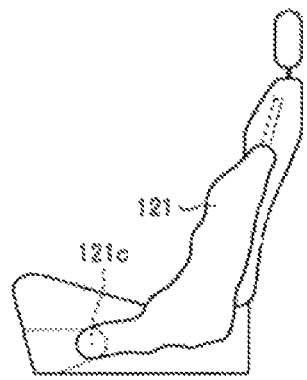
Figure 3C:
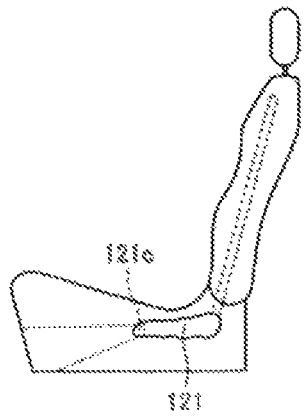

Here, a process of deployment of the airbag 121 guided by the guide path 131 will be described in detail. As illustrated in FIGS. 3A to 3D, the gas is injected from the inflator 111 into the airbag 121 such that, first the gas is injected into the airbag 121b, and then into the airbag 121c. Then, the expanded airbag 121c can no longer be stored in the storage portion 11b of the seat cushion 11 and is guided slightly downward and forward along the guide path 131 as illustrated in FIG. 3B. When the gas is further injected into the airbag 121c, the expanded airbag 121c is guided further downward and forward along the guide path 131 as illustrated in FIG. 3C. Meanwhile, the gas is also injected into the airbags 121a and 121e, and then the airbags 121b and 121d are protruded from the seat cushion 11 and deployed on the right and left sides of the seat cushion 11.

Figure 3D:
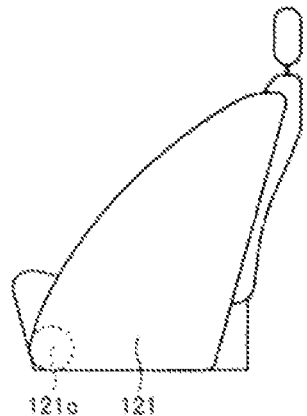

Then, when the gas is further injected into the airbag 121c, the airbag 121c is maximally expanded and guided to the front and bottom of the guide path 131 as illustrated in FIG. 3D. In this way, the airbag 121c which is the lower part of the airbag 121 is guided by the guide path 131, and deployed in the front and lower part of the seat 10.

As described above, the airbag 121 is deployed in a circular ring shape to surround the occupant P, and therefore it is possible to entirely cover the side surfaces of the occupant P. Consequently, it is possible to prevent a large force from being locally applied to the body of the occupant P, and therefore to improve the function to protect the occupant P.

Moreover, since the airbag 121c which is the lower part of the airbag 121 is guided downward and forward, the distance between the airbag 121c and the airbag 121f which is the upper part of the airbag 121 is increased. By this means, a tensional force is applied to the airbags 121a and 121b, and the airbags 121d and 121e, and therefore it is possible to repel a force to move the occupant P to the right and left sides.

Therefore, when a collision occurs, for example, on the left side of the occupant P, the occupant P moves to the left relative to the vehicle 1 and contacts the left part of the airbag 121, that is, the airbag 121a. The airbag 121 has a seamless ring shape, and therefore the right part of the airbag 121 (airbag 121e) repels a force to move the left part of the airbag 121 (airbag 121a), that is, functions as a tension member to apply a tensional force in the opposite direction. On the other hand, when a collision occurs on the right side of the occupant P, the left part of the airbag 121 (airbag 121a) functions as a tension member to apply a tensional force to the right part of the airbag 121 (airbag 121e). In this way, one of the right and left parts of the airbag 121 applies a tensional force to the other.

Therefore, it is possible to prevent the occupant P from moving to the left, and consequently to prevent the occupant P from contacting in-car components in a collision on the left side.

In addition, even though it is not possible to prevent the contact with the in-car components, it is possible to reduce the momentum of the occupant P with the airbag 121 clashing with the car-components. Therefore, it is possible to alleviate the impact on the occupant P, and consequently to improve the protection function.

Moreover, for example, when a front collision occurs, the airbag 121c which is the lower part of the ring-shaped airbag 121 is guided downward and forward, and therefore the lower part of the airbag 121 is moved forward.

In addition, the right and left upper parts of the ring-shaped airbag 121 (airbags 121a and 121e) cover the shoulders of the occupant P from the front, and therefore it is possible to prevent the occupant P from moving forward and any more. Therefore, it is possible to alleviate the impact on the occupant P, and consequently to improve the protection function.

Figure 4:
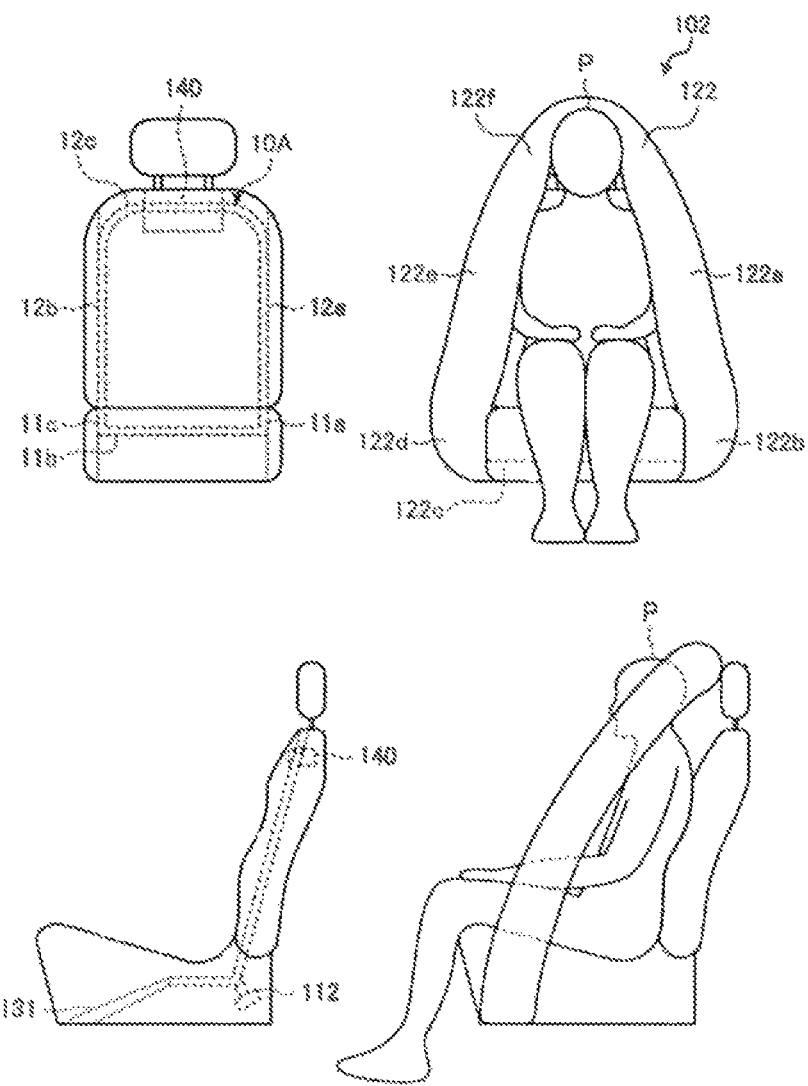
FIG. 4 illustrates a state when an airbag is stored and a state when the airbag is deployed according to another embodiment of the disclosure.

Next, a case where part of the airbag 121 is deployed above the head of the occupant P will be described. FIG. 4 illustrates a state when an airbag is stored and a state when the airbag is deployed according to another embodiment of the disclosure.

With the present embodiment, the storage member 10A configured to store an airbag 122 is provided in the seat 10, and the storage member 10A includes the storage portions 12a, 12b, and 12c of the seat back 12, and the storage portion 11a, 11b, and 11c of the seat cushion 11 in the same way as the above-described embodiment. Moreover, a seat protrusion 140 described later is provided in the upper part of the seat back 12. In addition, the guide path 131 configured to guide the deploying airbag 122 is provided in the seat cushion 11 in the same way as the above-described embodiment.

<Configuration of Occupant Protection Apparatus 102>

With the embodiment, an occupant protection apparatus 102 includes an inflator 112, the airbag 122, and the seat protrusion 140.

<Inflator 112>

The inflator 112 which is the same as the above-described inflator 111 generates gas based on the detection of a collision of the vehicle 1 or collision prediction, and injects the gas into the airbag 122.

<Airbag 122>

Like the above-described airbag 121, the airbag 122 has a circular ring shape and is stored in the seat 10. That is, the airbag 122 is stored in the storage portion 12a of the seat back 12, the storage portions 11a, 11b, and 11c of the seat cushion 11, and the storage portions 12b and 12c of the seat back 12. Here, also with the present embodiment, for the purpose of illustration, parts of the airbag 122 stored in the storage portion 12a of the seat back 12, the storage portions 11a, 11b, 11c of the seat cushion 11, and the storage portions 12b and 12c of the seat back 12 are referred to as airbags 122a, 122b, 122c, 122d, 122e, and 122f, respectively.

<Seat Protrusion 140>

The seat protrusion 140 is provided in the upper part of the seat back 12 of the seat 10 and formed integrally with the seat back 12. In addition, the side cross section of the seat protrusion 140 has a concave shape, and a groove is formed in the upper part of the seat protrusion 140 to hold the airbag 122. By this means, part of the airbag 122f which is the upper part of the airbag 122 is held from below.

Then, when a collision of the vehicle 1 or collision prediction is detected, the seat protrusion 140 is protruded upward by a protruding device (not shown). In addition, the seat protrusion 140 protrudes upward to the level higher than the head of the occupant P while holding the upper part of the airbag 122 (part of the airbag 122f).

Here, the seat protrusion 140 supports the part of the airbag 122f from below, and therefore does not inhibit the expansion of the airbag 122. In this embodiment, the seat protrusion 140 consistently holds part of the airbag 122f, but the disclosure is not limited to this. The seat protrusion 140 may release the airbag 122 after the airbag 122f has protruded upward. Alternatively, a penetration path is provided in the seat protrusion 140, and the airbag 122 is held in this penetration path.

The above-described protruding device includes, for example, an inflator, and is configured to actuate the inflator to protrude the seat protrusion 140 when a collision of the vehicle 1 or collision prediction is detected. In addition, the protruding device may be a spring member and normally fastened by a stopper, and the stopper may be released to actuate the protruding device. Moreover, the seat protrusion 140 may be protruded by a solenoid, or hydraulic pressure.

When the occupant protection apparatus 102 detects a collision of the vehicle 1 or collision prediction, the airbag 122 is deployed around the seat 10 in the same way as the airbag 121. In addition, the seat protrusion 140 is protruded upward by the protruding device, and therefore the upper part of the airbag 122 which is part of the airbag 122f is moved to above the head of the occupant P. Consequently, the circular ring-shaped airbag 122 fully encloses the occupant P including the head. By this means, the airbag 122 protects the occupant P including the head, and therefore, for example, in case of rolling of the vehicle 1, it is possible to appropriately protect the occupant P. Therefore, it is possible to protect the occupant P regardless of the collision type of the vehicle 1.

Figure 5:
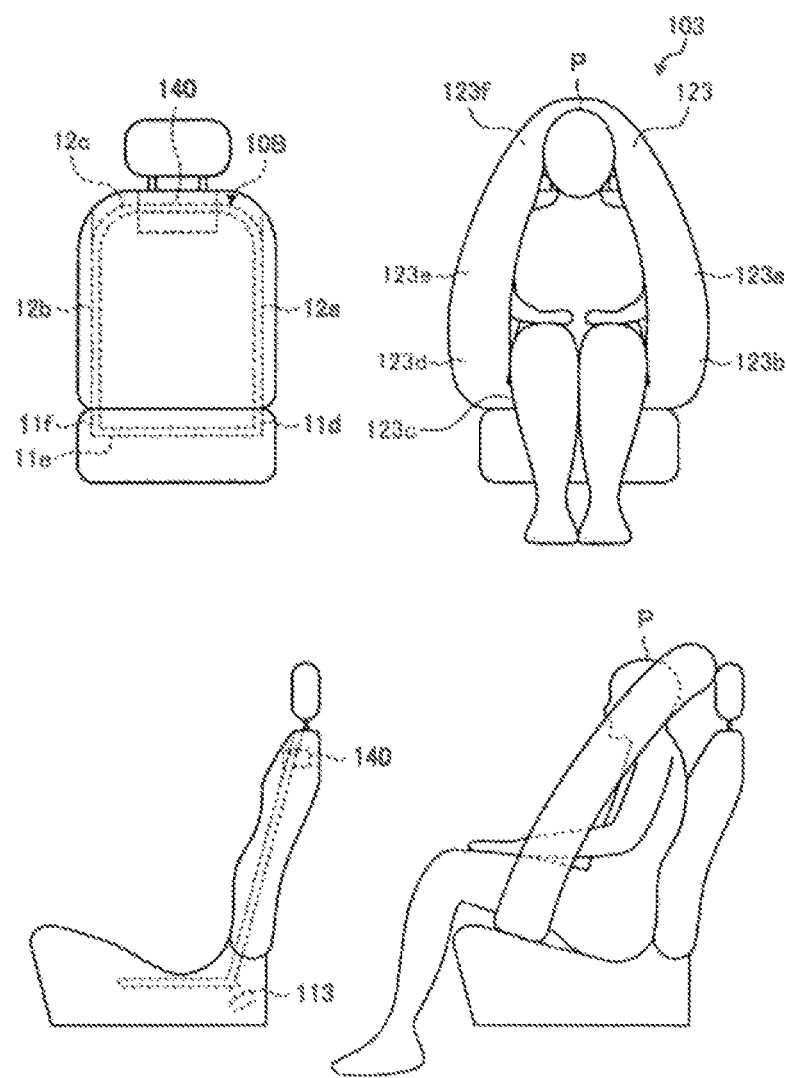
FIG. 5 illustrates a state when an airbag is stored and a state when the airbag is deployed according to further another embodiment of the disclosure.

Next, a case where an airbag protrudes from the seat cushion 11 and deploys above the seat cushion 11 will be described. FIG. 5 illustrates a state when an airbag is stored and a state when the airbag is deployed according to further another embodiment.

The seat 10 includes a storage member 10B configured to store an airbag 123 described later. The storage member 10B includes the storage portions 12a, 12b, and 12c of the seat back 12, and the storage portions 11d, 11e, and 11f of the seat cushion 11. The storage portions 12a, 12b, and 12c are the same as those of the above-described embodiments. In addition, the seat protrusion 140 which is the same as those of the above-described embodiment is provided in the upper part of the seat back 12.

The storage portion 11d of the seat cushion 11 is provided to extend along the left side of the seat cushion 11 from the back to the front of the seat cushion 11 in the same way as the storage portion 11a described above, and extends longer than the storage portion 11a toward the front of the seat cushion 11. In addition, the storage portion 11e of the seat cushion 11 is provided to extend from side to side in the seat cushion 11 in the same way as the storage portion 11b described above, and the width of the storage portion 11e in the front-to-back direction is wider than the storage portion 11b. Moreover, the storage portion 11f of the seat cushion 11 is provided to extend along the right side of the seat cushion 11 from the back to the front of the seat cushion 11 in the same way as the storage portion 11c described above, and extends longer than the storage portion 11c toward the front of the seat cushion 11 like the storage portion 11d. The storage portion 11d and the storage portion 11e of the seat cushion 11 connect with one another, and the storage portion 11e and the storage portion 11f of the seat cushion 11 connect with one another.

Moreover, the storage portion 12a of the seat back 12 and the storage portion 11d of the seat cushion 11 connect with one another, and the storage portion 11f of the seat cushion 11 and the storage portion 12b of the seat back 12 connect with one another. Therefore, like the storage member 10A, the storage portions of the storage member 10B of the seat 10 connect in the order of the storage portion 12a of the seat back 12, the storage portions 11d, 11e, and 11f of the seat cushion 11, the storage portions 12b, 12c and 12a of the seat back 12.

Further, a tear seam is provided in approximately the center of the upper surface of the seat cushion 11. By this means, when the airbag 123 is deployed, this tear seam tears to protrude the airbag 123 upward from the seat surface of the seat 10. Here, with the embodiment, differently from the above-described embodiments, the seat cushion 11 does not include the guide path 131.

<Configuration of Occupant Protection Apparatus 103>

With the embodiment, an occupant protection apparatus 103 includes an inflator 113, the airbag 123, and the seat protrusion 140.

<Inflator 113>

The inflator 113 which is the same as the above-described inflator 112 generates gas based on the detection of a collision of the vehicle 1 or collision prediction, and injects the gas into the airbag 123.

<Airbag 123>

Like the above-described airbag 122, the airbag 123 has a circular ring shape and is stored in the seat 10. Here, the airbag 123 extends longer than the airbag 122 toward the front of the seat cushion 11, and the width of the lower part of the airbag 123 is increased.

Here, also with this embodiment, for the purpose of illustration, parts of the airbag 123 stored in the storage portion 12a of the seat back 12, the storage portions 11d, 11e, 11f of the seat cushion 11, and the storage portions 12b and 12c of the seat back 12 are referred to as airbags 123a, 123b, 123c, 123d, 123e, and 123f, respectively.

<Seat Protrusion 140>

The seat protrusion 140 is the same as the seat protrusion 140 of the above-described embodiment. However, with the present embodiment, it is preferred that the seat protrusion 140 supports part of the airbag 123f from below, but does not consistently hold the part of the airbag 123f. That is, it is preferred that the airbag 123 freely moves from the seat protrusion 140 after the seat protrusion 140 protrudes the airbag 123f upward.

When the occupant protection apparatus 103 detects a collision of the vehicle 1 or collision prediction, the airbag 123 is deployed around the seat 10, like the airbag 122. In addition, the airbag 123 protrudes upward from the seat cushion 11, so that the occupant P floats from the seat cushion 11. By this means, in case of a lateral collision of the vehicle 1, the occupant P is easily moved parallel to the collision direction while sitting upright, and therefore to improve the function to protect the occupant P. For example, when the occupant P sits in the normal posture, there is a large friction between the legs and the hip of the occupant P and the seat cushion 11, and therefore the lower body of the occupant P is not moved but the upper body sways from side to side. As a result, the upper body of the occupant P is slanted. To address this, the airbag 123 is protruded upward from the seat cushion 11, and therefore it is possible to reduce the friction between the occupant P and the airbag 123, or between the airbag 123 and the seat cushion 11. By this means, the occupant P is moved parallel to the collision direction, and therefore it is possible to improve the function to protect the occupant P.

As described above, the occupant protection apparatus (101, 102, 103) according to the embodiments deploys the airbag (121, 122, 123) along the side surfaces of the seat 10 from the upper part to the lower part of the seat 10, and a tensional force is applied in the upper part and lower part of the seat 10 in the direction opposite to the direction in which the occupant P slumps against the airbag (121, 122, 123). Therefore, it is possible to prevent a large force from being locally applied to the body of the occupant P, and reduce the impact on the occupant P, and consequently to improve the function to protect the occupant P.

With the above-described embodiments, the guide path is provided to deploy the airbag forward and/or downward, but this is by no means limiting. The direction of the deployment may be set by the position where the airbag is fixed. For example, by providing a seat frame above the position where the airbag is stored and fixed, the airbag is deployed downward. In this case, the position at which the gas is injected into the airbag is set in the back part of the airbag, and the position at which the airbag is fixed is set also in the back part of the airbag in the front-to-back direction of the vehicle 1, and therefore the airbag is deployed forward. Moreover, for example, a tether configured to connect the upper inner wall to the lower inner wall of the airbag is provided in the back part of the airbag to sufficiently expand the front part of the airbag, and consequently the front part of the airbag is deployed downward in the front-to-back direction of the vehicle 1.

The invention claimed is:

1. An occupant protection apparatus comprising:
an airbag disposed along side surfaces of a seat from an upper part of the seat into space under a seat surface;
an upper holder configured to hold an upper part of the airbag, the upper holder being disposed between and above shoulders of an occupant to sit on the seat in a right-to-left direction; and
a tension member configured to, upon deployment of the airbag, apply a tensional force to a lower part of the airbag to pull the lower part in a direction opposite to a side surface on which the airbag is deployed, and
wherein the lower part of the airbag, upon deployment of the airbag, inflates and expands while under the seat surface; and wherein:
portions of the airbag are disposed on a right side and a left side of the seat and connect with one another under the seat surface; and
one of the portions on the right side and the left side applies the tensional force to the lower part of the other of the portions.

2. The occupant protection apparatus according to claim 1, wherein the lower part of the airbag is deployed downward or forward in the seat.

3. The occupant protection apparatus according to claim 2, further comprising an airbag guide configured to, upon deployment of the airbag, guide the lower part of the airbag to deploy downward or forward in the seat.

4. The occupant protection apparatus according to claim 1, wherein one of the portions of the airbag disposed on a right side of the seat and another one of the portions of the airbag disposed on a left side of the seat connect with each other in the upper part of the seat.

5. The occupant protection apparatus of claim 1, wherein the lower part of the airbag inflates and expands from a rearward storage position under the seat to a forward deployment position under the seat.

6. The occupant protection apparatus of claim 1, wherein the lower part of the airbag inflates and expands following inflation and expansion of a side portion of the airbag positioned closest to a side location of the vehicle anticipated for initial contact.

7. An occupant protection apparatus comprising:
an airbag disposed along side surfaces of a seat from an upper part of the seat into space under a seat surface such that the airbag extends along under the seat surface from one side of the seat to the other side of the seat;
an upper holder configured to hold an upper part of the airbag, the upper holder being disposed between and above shoulders of an occupant to sit on the seat in a right-to-left direction; and
a tension member configured to, upon deployment of the airbag, apply a tensional force to a lower part of the airbag to pull the lower part in a direction opposite to a side surface on which the airbag is deployed, and
wherein the lower part of the airbag is received within an inflation guide path that originates below an upper surface of the seat and extends to a tear region on the upper surface of the seat such that the lower part of the airbag, which includes an inflatable portion extending under the upper surface of the seat, expands upward upon inflation within the inflation guide path, or the lower part of the airbag is received within an inflation guide path that originates below the upper surface of the seat and extends from a rearward, under seat storage location to a more forward region of the seat such that the lower part of the airbag, with inflatable portion extending under the upper surface of the seat, expands forward upon inflation within the inflation guide path.

8. The occupant protection apparatus according to claim 7, wherein, upon deployment, the airbag protrudes upward from the seat surface.

9. The occupant protection apparatus of claim 7, wherein the inflation guide path for the lower part of the airbag extends to the tear region on the upper surface of the seat such that the lower part of the airbag, upon expansion, moves from below the upper surface of the seat to above the upper surface of the seat.

10. The occupant protection apparatus of claim 7, wherein the inflation guide path for the lower part of the airbag extends from the rearward, under seat storage location to the more forward region of the seat to accommodate the forward expanding portion of the lower part of the airbag such that the lower part of the airbag, upon inflation and expansion, moves from the seat storage location at the rearward, under seat location to a more forward position still under the upper surface of the seat.

11. The occupant protection apparatus of claim 10, wherein the inflation guide path extends both forward and downward.

12. The occupant protection apparatus of claim 7, wherein the lower part of the airbag inflates and expands following inflation and expansion of a side portion of the airbag positioned closest to a side location of the vehicle anticipated for initial contact.

13. An occupant protection apparatus comprising:
a first storage portion provided along a left side of a seat back of a seat;
a second storage portion provided along a right side of the seat back;
a third storage portion provided under a seat surface of a seat cushion of the seat, the third storage portion connects with the first storage portion and the second storage portion;
an airbag including a first inflatable airbag portion stored in the first storage portion, a second inflatable airbag portion stored in the second storage portion, and a third inflatable airbag portion having an inflatable section stored under the seat surface of the seat cushion in the third storage portion such that the inflatable section of the third inflatable airbag portion extends along under the seat surface from one side of the seat to the other side of the seat, the third inflatable airbag portion connects with the first inflatable airbag portion and the second inflatable airbag portion; and
an upper holder configured to hold upper parts of the first inflatable airbag portion and the second inflatable airbag portion, the upper holder being disposed between and above shoulders of an occupant to sit on the seat in a right-to-left direction.

14. The occupant protection apparatus according to claim 13, wherein the lower part of the airbag is deployed downward or forward in the seat.

15. The occupant protection apparatus according to claim 14, further comprising an airbag guide configured to, upon deployment of the airbag, guide the lower part of the airbag to deploy downward or forward in the seat.

16. The occupant protection apparatus according to claim 13, wherein the third inflatable airbag portion, upon inflation and expansion, moves from the third storage portion to a more forward position still under the seat surface of the seat cushion.

17. The occupant protection apparatus according to claim 16, further comprises a guide path provided under the seat surface of the seat cushion,
wherein the guide path extends forward from the third storage portion and a width of the guide path increases toward forward,
wherein the third inflatable airbag portion, upon inflation and expansion, moves forward along the guide path.

* * * * *